3,242,231
PROCESS FOR MAKING GRAFT POLYMERS
WITH POLYSULFONE GRAFTS
Boynton Graham and Walter E. Mochel, Wilmington, Del., assignors to E. I. du Pont de Nemours and Company, Wilmington, Del., a corporation of Delaware
No Drawing. Filed Oct. 11, 1961, Ser. No. 144,300
14 Claims. (Cl. 260—877)

This invention relates to, and has as its principal object provision of, a novel process for preparing certain graft copolymers.

In the preparation of a graft copolymer, active sites are prepared along the main chain of a polymer, and at these sites polymer chains from a monomer species different from that of the backbone chain are induced to grow, the grafted polymer chains being chemically bound to the backbone chain. This process constitutes a unique means for preparing products combining the desirable properties of two different homopolymers without sacrificing certain other physical properties, such as heat resistance and solvent resistance, which customarily diminish when a conventional copolymer of the two materials is prepared.

It has recently been found that, when active sites are prepared on a polymer by means of high-energy ionizing radiation, it is possible to graft copolymerize not only an individual monomeric species but even a mixture of sulfur dioxide (a nonpolymerizable material) with an olefin to yield grafted olefin polysulfone chains (see U.S. Patent No. 3,170,892).

The process of this invention provides graft copolymers of olefin polysulfones on other polymers characterized by improved resistance to creep under load over similar graft copolymers prepared by means of ionizing radiation. In this process, a polymeric substrate is first activated by exposure to ozone at a temperature below about 60° C., and the activated substrate is then exposed to a mixture of sulfur dioxide and an olefin at a temperature above about 60° C. until a graft copolymer of an olefin polysulfone on the substrate polymer is obtained.

It is to be understood that in this process the ozone-treated substrate polymer is brought in contact with the sulfur dioxide/olefin mixture while at least some of the activity attributable to the action of the ozone is still active. The ozone-induced activity of the substrate polymer is stable almost indefinitely at room temperature and temperatures below room temperature. When the storage time is only a matter of minutes or even up to several hours, room-temperature storage is satisfactory. Storage temperatures up to 60° C. may be used when the storage time is a few minutes or less, and preferably less than one minute.

The activation of the polymer substrate by ozone may be carried out at any temperature up to about 60° C. At temperatures above 60° C., the primary action of ozone on the polymer substrate is an oxidative degradation of the polymer rather than the formation of active sites for grafting. The ozone treatment may be carried out satisfactorily at room temperature, and temperatures below room temperature may also be employed. For example, temperatures in the range of −100° C. to 60° C. may be used and temperatures in the range of 0° C. to 60° C. are preferred.

Ozone for use in the process of this invention may be either pure ozone, as in liquid or gaseous ozone, solutions of ozone in suitable solvents, or a gaseous mixture of ozone with some other gaseous medium, such as air, oxygen, nitrogen, helium, or the like. Ozone prepared by passing air or oxygen through ozone generators that are commercially available is operable in the process of this invention. The concentration of the ozone in the air, oxygen, or other gas is not critical. Any concentration produced by an ozone generator may be used. However, extremely low concentrations require very low reaction times.

Organic polymers suitable as substrates in this invention include any normally solid organic polymeric material with molecular weight of 5000 or greater. The polymers may be linear, branched, isotactic, or atactic and may be oriented or unoriented. Thus, there may be employed hydrocarbon polymers, such as polyethylene, polypropylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polyvinyl fluoride, vinylidene fluoride/hexafluoropropylene copolymers, and the like; ester-containing polymers, such as polyvinyl acetate, polymethyl methacrylate, polyethylene terephthalate, poly(p-hexahydroxylylene terephthalate) and the like; hydroxy-containing polymers, such as polyvinyl alcohol, cellulose, regenerated cellulose, and the like; ether-containing polymers, such as solid polytetrahydrofuran, polyoxymethylene, dioxolane polymers, ethylene oxide polymers, and the like; condensation polymers, such as phenol-formaldehyde polymers, ureaformaldehyde polymers, triazin-formaldehyde polymers, polyamides, polyesters, polyimides, and the like; polyacrylonitrile, polyvinyl acetals, polyureas, polyurethanes, and mixtures of copolymers based on two or more of the above compounds, as well as natural polymers such as cotton, wool, silk and the like.

Of these organic polymer substrates, a preferred class, because they are highly reactive, are those in which the backbone chain of the substrate material is substantially entirely a chain of carbon atoms and particularly those polymers in which such carbon chains are free of aliphatic carbon-to-carbon unsaturation. Still more preferred, because of their exceptional response to the process of this invention, are the hydrocarbon polymers of the above group, such as polyethylene, polypropylene, polyisobutylene, polystyrene, and the like.

The shape of the substrate employed in this invention is not critical. It may be in the form of a powder, granule, fiber, fabric, film, monofilament, beading, tape, tube, pipe, bottle, molded object, or the like. Preferably the substrate is preformed into the shape of its ultimate use prior to grafting.

The step of contacting the ozone-activated substrate with a mixture of sulfur dioxide and an olefin may be carried out at any temperature above 60° C. Temperatures between 60° and 300° C. are preferred, although temperatures above 300° C. are operable if very short reaction times are used. The temperature is preferably below the flow or deformation temperature of the ozonized substrate.

Olefins suitable for use in this invention are those known in the art to react with sulfur dioxide to yield olefin/$SO_2$ polysulfones. Thus, there may be employed such olefins as ethylene, propylene, isobutylene, 1-butene, 1-pentene, 2-pentene, 1-octene, 1-nonene, 1-eicosene, cyclohexene, 3-cyclohexyl-1-propene, 3-methylcyclohexene, 4-isopropyl-1-methyl-3-cyclohexene, butadiene, isoprene, 1,4-pentadiene, 1,5-hexadiene, styrene, and the like.

A preferred class of olefins for use in this invention are those of the formula

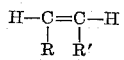

where R may be hydrogen or methyl, R′ may be hydrogen or an alkyl group with up to 18 carbon atoms, and R and R′, taken together, may be a saturated hydrocarbon diradical, having from one to four carbon atoms in the chain and containing up to seven carbon atoms. A particularly preferred group are the lower 1-alkenes.

Pressure is not a critical factor in this invention, atmospheric pressure as well as pressures far above and below atmospheric pressure being suitable. In systems having a gaseous phase, for example where the olefin is a gas, the amount of grafting increases with increased pressure.

The mole ratio of olefin/sulfur dioxide for use in the invention is likewise not critical. For consumption of all these materials in the formation of a polysulfone chemically bonded to the substrate, the molar ratio is generally 1/1. Departure from this ratio usually results in non-utilization of one of the ingredients of the mixture. Ratios in the range 20/1 to 1/20 will generally be employed. Ratios outside this range are usable, particularly where a liquid phase is involved, e.g., where the mixture consists of an olefin dissolved in liquid sulfur dioxide.

In the process of this invention, it is necessary to carry out the contacting of the ozonized substrate with the mixture of sulfur dioxide and an olefin in the essential absence of molecular oxygen. Otherwise, little or no grafting is obtained.

The graft copolymers of olefin polysulfones on organic polymer substrates, which are the products of this invention, are useful in all manner of shaped structures: in fibers for the knitting or weaving of fabrics; in films for wrapping and protecting other objects; in monofilaments for the making of rope and fishing nets; in extruded shapes as decorative moldings; in tubing, pipe, and bottles for the handling of organic liquids, aqueous acids, and the like, as well as in molded objects of all sorts.

In the following examples, parts are by weight, and Example I represents a preferred embodiment.

Example I

*Part A.*—A 1.5 mil film of low density polyethylene is suspended for 30 minutes at room temperature in a chamber filled with oxygen containing 1.75–2.1 g. ozone/cubic foot (about 5% ozone). Weight gain is 0.37%. The ozonized film is held for one hour in air at room temperature, and then put in a nitrogen-flushed pressure reactor. The reactor is evacuated and a mixture of 179 parts deoxygenated sulfur dioxide and 4.5 parts water is injected under 700 lb./sq. in. ethylene pressure. The reactor is heated to 90° C. during 63 minutes and rocked for one hour at 90° C. under 700 lb./sq. in. ethylene pressure. The resultant graft copolymer film of ethylene polysulfone on polyethylene shows a gain of 56% in weight. It is stiff and hazy, and has tensile strength: elongation:modulus values of 2194 lb./sq. in.: 9%: 62,000 lb./sq. in., as compared to initial values of 2188:389:24,000.

*Part B.*—The ozone-initiated graft copolymers of this invention have the advantage over otherwise similar graft copolymers prepared by means of high energy irradiation in that the ozone-initiated graft copolymers have greatly improved resistance to creep under load. This is confirmed by comparing the low elongation (9%) shown in Part A above with the much higher elongation in a graft copolymer prepared as follows:

A 1.5 mil film of low density polyethylene is wrapped in aluminum foil, cooled to −80° C., and irradiated to a dosage of 25 mrads in 20 passes under a beam of 2 mev. electrons from a Van de Graaff generator. The irradiated film is stored for 2.75 hours at −80° C. and then placed in a glass-lined steel bomb which has been flushed with nitrogen and cooled to −80° C. and contains 80 parts of sulfur dioxide and 2 parts of 0.1% aqueous cuprous chloride. The bomb is closed, evacuated, and then pressured with ethylene. It is then warmed at 25° C. and agitated for four hours under 700 lb./sq. in. pressure of ethylene. The bomb is then opened and the graft copolymer film shows a weight gain of 54% over the original ungrafted film. This film has tensile strength: elongation:modulus values of 3538 lb./sq. in.: 90%:67,-000 lb./sq. in.

Example II

The procedure of Part A of Example I is repeated except that after the ozone treatment the film is held for 18 hours at room temperature under reduced pressure (0.05 mm. Hg) prior to the reaction with sulfur dioxide and ethylene. The resulting graft copolymer of ethylene polysulfone on polyethylene shows a weight gain of 28.5% based on the weight of the ungrafted polyethylene film.

Examples III—VII

In Examples III—VII the general procedure of Part A of Example I is repeated except for the indicated changes in the time of exposure to the ozone mixture and the time and temperature of the reaction cycle with sulfur dioxide and ethylene in the reactor. The weight gain due to the grafting of ethylene polysulfone onto the polyethylene films in each example is also indicated.

| Example | Minutes Exposure to Ozone | Reaction Cycle | | Percent Weight Gain |
|---|---|---|---|---|
| | | Minutes | ° C. | |
| III | 5 | 30 | 90 | 25 |
| IV | 15 | 60 | 90 | 59 |
| V | 15 | 14 | 25 to 90 | 10 |
| VI | 30 | 30 | 90 | 74 |
| VII | 30 | 60 | 65 | 4 |

A portion of the grafted film obtained in Example IV is soaked in mineral oil at 150° C. for two hours. At the end of this time it can readily be peeled apart into two films, indicating the presence of an oil-insensitive graft copolymer at each face of the grafted film, with a core of ungrafted polyethylene in the center.

The general nature of the improved resistance to creep under load, characteristic of the products of this invention, is shown in Table I by comparing the elongation values of products of the indicated examples with olefin polysulfone graft copolymers prepared by irradiation grafting in the manner of Part B of Example I.

TABLE I

| Film Tested | | Tensile Strength (lb./sq. in.) | Elongation (Percent) | Modulus (lb./sq. in.) |
|---|---|---|---|---|
| Product of Example | Control Wt. Gain [1] (Percent) | | | |
| II | 27 | 2,064 | 104 | 25,300 |
| | | 2,578 | 243 | 37,500 |
| III | 27 | 1,696 | 11 | 34,700 |
| | | 2,578 | 243 | 37,500 |
| V | 12 | 1,621 | 16 | 17,400 |
| | | 2,136 | (about 300) | 36,287 |
| VI | 74 | | (nil) | |
| | | | 120 | |

[1] Irradiation graft copolymer of ethylene polysulfone on polyethylene with indicated wt. gain, prepared by process like Example I, Part B.

Example VIII

A film of biaxially oreinted polyethylene terephthalate film 0.00025 inch thick is ozonized by exposure on one side only for five minutes to a mixture of 5% ozone in oxygen. The ozonized film is then reacted with a mixture of sulfur dioxide and ethylene using the procedure of Part A of Example I with a reaction cycle of 30 minutes at 90° C. The resulting graft copolymer film of ethylene polysulfone on polyethylene terephthalate is somewhat hazy and shows a weight gain of 3.3% based on the weight of the ungrafted film.

Example IX

A film of ethylene/propylene (41/59 by wt.) copolymer elastomer 0.003 inch thick is exposed to a mixture of 5% ozone in oxygen for 30 minutes. The ozonized film is then reacted with a mixture of sulfur dioxide and ethylene using the procedure of Part A of Example I with a reaction cycle of 30 minutes at 90° C. The resulting graft copolymer film of ethylene polysulfone on ethylene/propylene copolymer has a hard, tack-free surface over an extensible core.

The ozone-activated process for preparing grafted olefin polysulfones on other polymers is particularly advantageous over radiation-initiated grafting when it is desired to prepare a graft copolymer coating on only one area or side of a substrate such as a film, bottle, pipe, or the like. As illustrated in Example VIII the present process permits activation of a selected surface of the substrate without treatment of the remaining surfaces. On the other hand, when activation is carried out by means of penetrating radiation, all surfaces as well as the interior bulk of the substrate polymer are activated and it is necessary to use extreme care and carefully controlled contact times to prepare graft copolymers on limited areas of the substrate. With rapidly penetrating grafting components it is particularly difficult to carry out grafting limited to selected areas of an irradiated substrate. With activation by irradiation, grafting also readily occurs throughout the bulk of the substrate, causing such forms as films and fibers to grow substantially in their major directions. As illustrated in Example IV the ozone-activated grafting of the present invention is much more readily limited to surface modification of the substrate when this is desired.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process of forming a graft copolymer which comprises sequentially (1) activating a substrate formed from a normally solid organic polymer having a molecular weight of at least 5000 by contacting the same with ozone at a temperature below about 60° C. and (2) contacting the activated substrate with a mixture of sulfur dioxide and an olefin at a temperature above about 60° C.

2. The process of claim 1 wherein the polymer is hydrocarbon.

3. The process of claim 2 wherein the polymer is polyethylene.

4. The process of claim 2 wherein the polymer is polypropylene.

5. The process of claim 2 wherein the polymer is an ethylene/propylene copolymer.

6. The process of claim 1 wherein the polymer is halogenated hydrocarbon.

7. The process of claim 1 wherein the polymer is ester-containing.

8. The process of claim 7 wherein the polymer is polyethylene terephthalate.

9. The process of claim 1 wherein the olefin is selected from the group consisting of

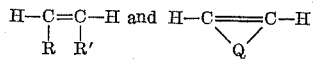

wherein:
R is hydrogen or methyl;
R′ is hydrogen or alkyl of up to 18 carbons; and
Q is a saturated hydrocarbon diradical having from 1 to 4 carbons in the chain and containing up to 7 carbons.

10. The process of claim 9 wherein the olefin is ethylene.

11. The process of claim 1 wherein the olefin/sulfur dioxide ratio is between 20/1 and 1/20.

12. The process which comprises sequentially (1) activating a substrate of solid polyethylene by contacting the same with ozone at a temperature below about 60° C. and (2) contacting the activated substrate with a mixture of sulfur dioxide and ethylene at a temperature above about 60° C.

13. The process which comprises sequentially (1) activating a substrate of solid polyethylene terephthalate by contacting the same wtih ozone at a temperature below about 60° C. and (2) contacting the activated substrate with a mixture of sulfur dioxide and ethylene at a temperature above about 60° C.

14. The process which comprises sequentially (1) activating a substrate of solid ethylene/propylene copolymer by contacting the same with ozone at a temperature below about 60° C. and (2) contacting the activated substrate with a mixture of sulfur dioxide and ethylene at a temperature above about 60° C.

References Cited by the Examiner

UNITED STATES PATENTS

| 2,976,269 | 3/1961 | Jong | 260—79.3 |
| 3,115,418 | 12/1963 | Magat et al. | 204—154 |
| 3,170,892 | 2/1965 | Busse | 260—859 |

FOREIGN PATENTS

| 825,680 | 12/1959 | Great Britain. |
| 1,161,824 | 9/1958 | France. |

MURRAY TILLMAN, Primary Examiner.

LEON J. BERCOVITZ, Examiner.